Nov. 14, 1967  C. THOMSON  3,352,408
CABLE BELT

Filed April 13, 1966  3 Sheets-Sheet 2

United States Patent Office 3,352,408
Patented Nov. 14, 1967

3,352,408
CABLE BELT
Charles Thomson, Surrey, England, assignor to Solar Thomson Engineering Company Limited
Filed Apr. 13, 1966, Ser. No. 542,303
Claims priority, application Great Britain, Apr. 13, 1965, 15,859/65
8 Claims. (Cl. 198—201)

ABSTRACT OF THE DISCLOSURE

A conveyor belt of flexible material having a plurality of transversely extending resilient spring steel straps extending through two cable-locating members to fix them in an abutting relationship against the edges of the belt. The cable-locating members are formed separately from the belt, are of a more elastic material than that of the belt, and each has two pairs of parallel ribs projecting in opposite directions from the belt to define two cable-receiving grooves which are substantially continuous for the length of the belt.

---

This invention is concerned with conveyor belts for conveyors of the kind in which a conveyor belt is supported and driven by cables. The conveyor belt in such conveyors is customarily provided with means for locating the cables laterally at each face of the belt, so that the cables and belt are positively located laterally relative to each other both on the carrying run and on the return run of the belt, which means comprise projections (e.g. longitudinal ridges) carried by the belt.

According to the present invention, there is provided a conveyor belt for a conveyor of the kind referred to wherein the belt is made of flexible material having therein a plurality of transversely-extending resilient strips each of which projects at both ends from the belt, and cable-locating means formed separately from the belt are carried on said projecting ends of the resilient strips, said cable-locating means abutting the edges of the belt and presenting outer surfaces which are substantially continuous for the length of the belt.

Since the cable-locating means are formed separately from the belt, they can be made of different material from the belt. The properties required in the material of the cable-locating means and the material of the belt are not the same and accordingly the present invention enables different materials to be selected according to their intended use without the limitations on selection of material imposed by the cable-locating means being made of the same material as the belt. For example, where flame resistance is required, a material of relatively low elasticity, e.g. polyvinyl chloride, could be used for the belt and a material of higher elasticity, e.g. neoprene, could be used for the cable-locating means, which, owing to the fact that said means are deeper than the belt, must be made of material of high elasticity to avoid cracking when they pass round the relatively small pulleys at the terminals of the conveyor. At the same time, the present invention retains the advantage of substantially continuous outer surfaces for the cable-locating means, which is the main advantage of prior proposals having cable-locating means in the form of continuous ribs within the width of the belt and integral therewith. A continuous outer surface avoids dangers to personnel which are caused by non-continuous arrangements and facilitates proper re-engagement of the cables with the cable-locating means.

The cable-locating means may comprise a plurality of cable-engaging members which abut one another. Each cable-engaging member may be carried on a projecting end of a single resilient strip or on projecting ends of a plurality of strips.

Alternatively, the cable-locating means may comprise two cable-engaging members each extending along the whole length of one edge of the belt.

The cable-locating means may comprise cable-engaging members each having two pairs of parallel ribs projecting in opposite directions therefrom to define two cable-receiving grooves associated with the two faces of the belt. Each rib may be disposed directly opposite to a rib projecting in the opposite direction. Preferably, however, each rib is laterally displaced from both of the oppositely-projecting ribs on the same cable-engaging member. Thus, when the belt is coiled for transport or storage, the ribs do not interfere with one another and the diameter of the coil is minimised.

In an alternative arrangement, the cable-locating means comprises cable-engaging members each having a pair of parallel ribs projecting in only one direction therefrom to define a cable-receiving groove associated with one face of the belt. In this case, cable-receiving grooves associated with the other face of the belt may be provided by two pairs of parallel ribs formed in one piece with the belt and spaced laterally inwards for a substantial distance from said cable-engaging members. The grooves provided by the integral ribs locate the cables on the carrying run of the belt and thus this arrangement provides a reduced coiling diameter in combination with a reduced bending moment.

The following is a description, by way of example, of a conveyor belt of known construction and of various embodiments of the present invention. Reference is made to the accompanying drawings, in which:

FIGURES 1–4 show in chain lines the positions occupied by adjacent parts of the belts when coiled, and also the positions of driving cables.

Figure 1:
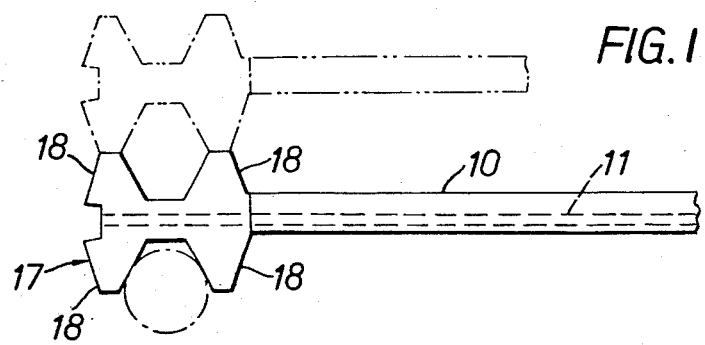
FIGURES 1, 2, 3 and 4 are cross-sections through one side of four different embodiments of conveyor belt in accordance with the present invention.

In each construction shown in the drawings, the conveyor belt 10 is made of a suitable flexible material, e.g. rubber or rubber-like material or polyvinyl chloride, reinforced by fabric embedded therein. Spring steel straps 11 are embedded in the belt 10.

It is generally known to provide a conveyor belt which has straps extending across the full width of the belt and spaced about 3 or 4 inches apart longitudinally of the belt. The belt is provided with guideways in the form of grooves at the edge of each face thereof to fit the driving ropes or cables which run round pulleys. It will be seen that the straps have to be strong enough to support the load being conveyed over a span which is substantially equal to the belt width, say a span of 34 inches for a 36 inch wide belt. The grooves are in pairs in which one groove is vertically above another, and are formed by continuous longitudinal ribs projecting from the opposite faces of the belt. Each rib is therefore directly opposite to a rib projecting from the other face of the belt. Consequently, when the belt is coiled on a core for transport, the ribs engage on one another and the effective coiling thickness of the belt is equal to the thickness of the carcase body of the belt plus twice the height of each rib.

In the embodiments of the present invention shown in FIGURES 4–8, each strap 11 extends across the full width of the belt and projects at both ends beyond the edges of the belt.

In the embodiments of FIGURES 1–3 and 5–8, the projecting ends of the straps 11 carry separately-formed cable-engaging members 17 (made, for example, of neoprene) each of which has two pairs of parallel ribs 18 of tapering cross-section and projecting in opposite directions to define two cable-receiving grooves associated with the two faces of the belt 10. The members 17 abut the edges of the belt. The straps pass through the members 17 and may be riveted over at the ends against washers to retain the members 22.

Figure 2:
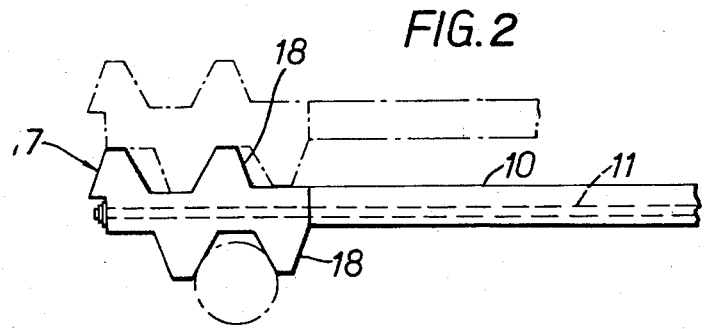
Figure 3:
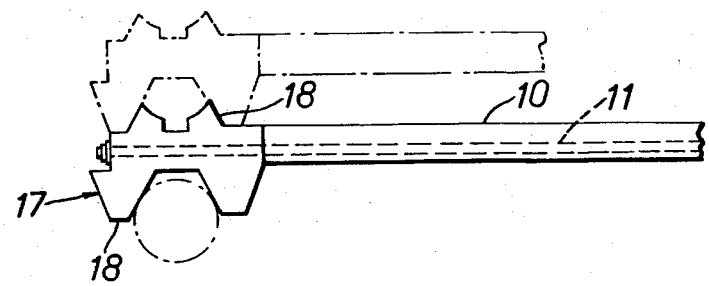

In the embodiment of FIGURE 1, the oppositely-projecting ribs 18 are directly opposite to one another. In the embodiment of FIGURE 2, the oppositely-projecting ribs are slightly off-set laterally of the belt, so that if the belt is coiled the ribs will interfit and thus reduce the coiling diameter. In the embodiment of FIGURE 3, the ribs 18 associated with the top face of the belt (i.e. the face which is uppermost on the carrying run) are smaller and closer together than the oppositely-extending ribs and can thus fit between the last-mentioned ribs if the belt is coiled. Again, the coiling diameter is reduced.

Figure 5:
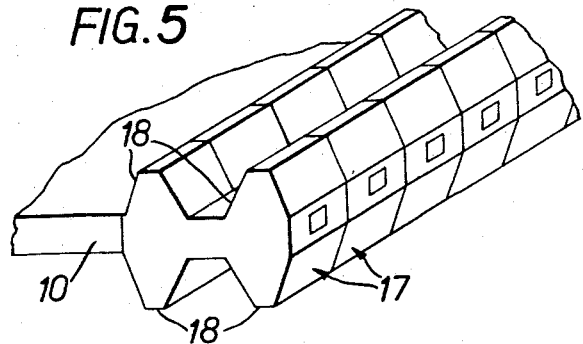
FIGURES 5, 6 and 7 are perspective views of sections of one side of three embodiments of the present invention.
Figure 6:
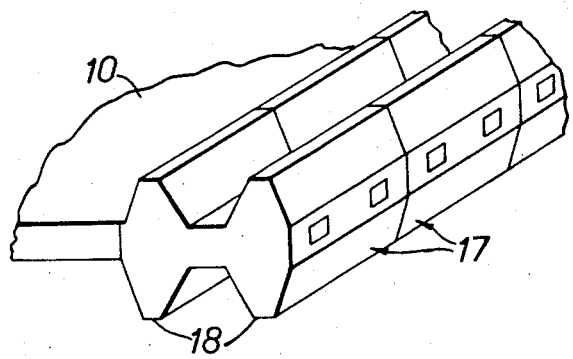

The embodiment of FIGURE 5 has a separate cable-engaging member 17 on each end of each strap 11. In the embodiment of FIGURE 6, each cable-engaging member 17 is carried by ends of two adjacent straps 11. In both FIGURES 5 and 6, the cable-engaging members abut one another and present substantially continuous outer surfaces over the whole length of the belt, i.e. the ribs and grooves are substantially continuous and un-interrupted for the full length of the belt.

Figure 7:
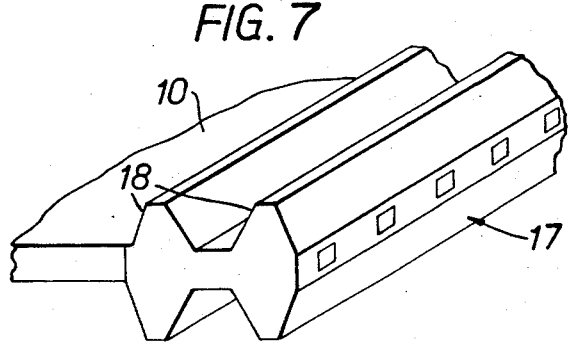

In the embodiment of FIGURE 7, a single cable-engaging member extends un-interruptedly for the whole length of each edge of the belt.

Although the embodiments of FIGURES 5, 6 and 7 have the cross-section of FIGURE 1, other suitable cross-sections may be used, e.g. those of FIGURES 2, 3, 4 and 8.

Figure 8:
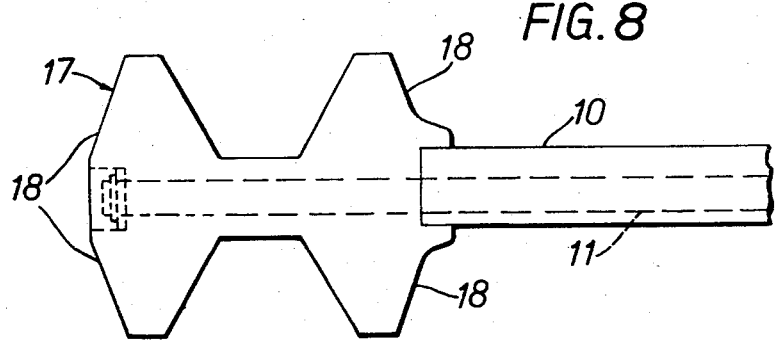
FIGURE 8 is a cross-section through one side of a further embodiment of the present invention.

The embodiment of FIGURE 8 is substantially the same as that of FIGURE 1, except that each cable-engaging member 17 has a longitudinal groove or recess into which fits an edge of the belt for sealing purposes.

Figure 4:
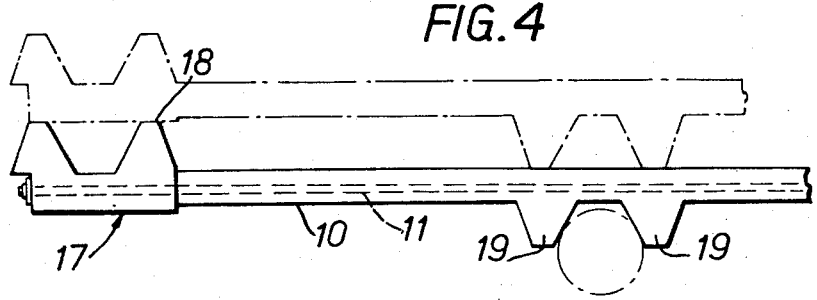

The embodiment of FIGURE 4 employs cable-engaging members 17 having only a pair of ribs 18 on each member. The members 17 may otherwise be constructed as shown in FIGURES 5–7. The grooves between the ribs 18 in FIGURE 4 are used for locating the cables on the return run of the belt. To locate the cables on the carrying run of the belt, the belt is provided on one face with two pairs of parallel ribs 19 which are integral with (i.e. made in one piece with) the belt. The ribs 19 are substantially closer than the ribs 13 to the centre line of the belt.

In the embodiments of FIGURES 1, 5, 6 and 7, there is a small step on the cable-engaging member at the base of the upper rib nearest to the belt. This step may if desired be omitted so that the upper ribs have the same profiles as the lower ribs.

The embodiment of FIGURE 3 may be modified by cranking the end of the resilient strap upwards so that the cable-engaging member projects upwardly from the belt where it abuts the latter.

It will be understood that it is an essential feature of all of the embodiments shown in FIGURES 1–8 that the cable-engaging members 17 abut the edges of the belt 10 and present outer surfaces which are substantially continuous for the length of the belt.

I claim:

1. A conveyor belt adapted to be supported and driven by cables, comprising a belt made of flexible material, a plurality of transversely-extending resilient spring steel straps in said belt each of which projects at both ends from the belt, and two cable-locating members formed separately from the belt and being of a material which is more elastic than the material of said belt, said straps extending through said cable-locating members and fixing same in an abutting relationship against the edges of the belt, said cable-locating members each having two pairs of parallel ribs projecting in opposite directions therefrom to define two cable-receiving grooves which are substantially continuous for the length of the belt.

2. A conveyor belt according to claim 1, wherein said ribs are arranged and shaped in a manner so as to permit nesting of same when the belt is coiled.

3. A conveyor belt according to claim 2, wherein each of said ribs is laterally offset relative to the other ribs.

4. A conveyor belt according to claim 2, wherein the ribs projecting relative to the nonload-carrying face of the belt are closer to the longitudinal central axis of the belt than the ribs projecting relative to the load-carrying face of the belt.

5. A conveyor belt according to claim 1, wherein each of the cable-locating members comprises a plurality of cable-engaging segments which abut one another.

6. A conveyor belt according to claim 5, wherein each cable-locating segment is carried on a projecting end of a single strap.

7. A conveyor belt according to claim 5, wherein each cable-locating segment is carried on projecting ends of a plurality of straps.

8. A conveyor belt according to claim 1, wherein each cable-locating member extends along the whole length of one edge of the belt.

References Cited

UNITED STATES PATENTS

| | | | |
|---|---|---|---|
| 423,906 | 3/1890 | Conkling | 198—20 |
| 2,656,035 | 10/1953 | Thompson et al. | 198—201 |
| 2,751,065 | 6/1956 | Thompson | 198—191 |
| 2,903,123 | 9/1959 | Naylor | 198—191 |
| 3,162,295 | 12/1964 | Adamson | 198—191 X |

FOREIGN PATENTS 821,613  10/1959  Great Britain.

GERALD M. FORLENZA, *Primary Examiner.*

EVON C. BLUNK, *Examiner.*

R. J. HICKEY, *Assistant Examiner.*